S. WALKER.
WHEELED SCRAPER.
APPLICATION FILED JULY 11, 1917.
1,269,347.
Patented June 11, 1918.
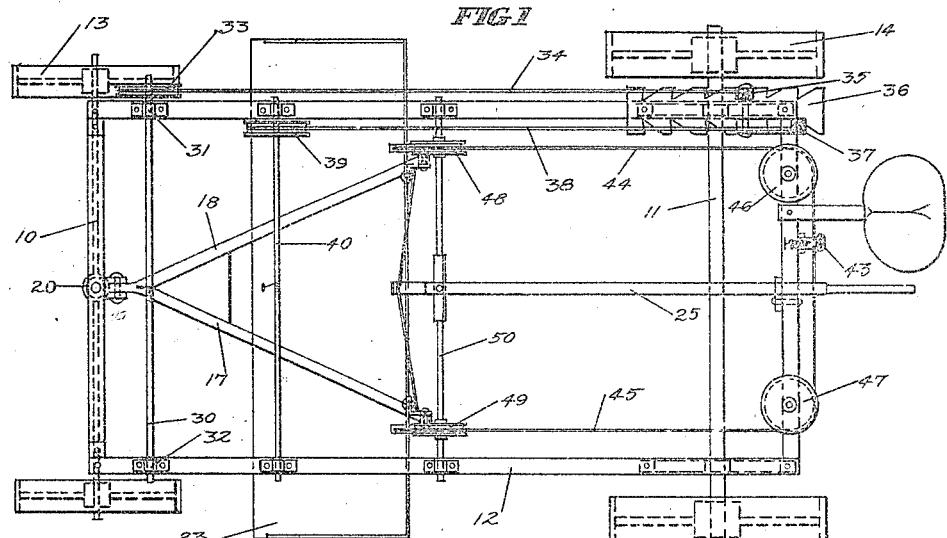
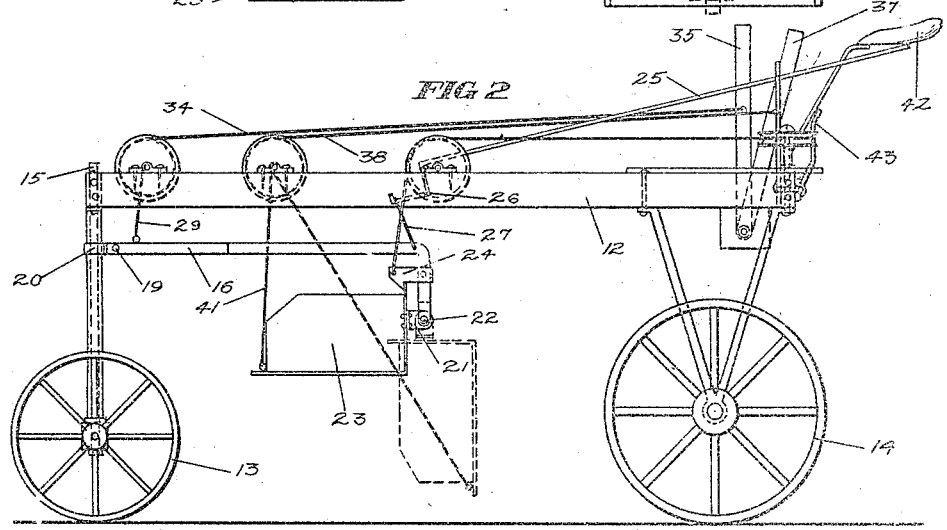
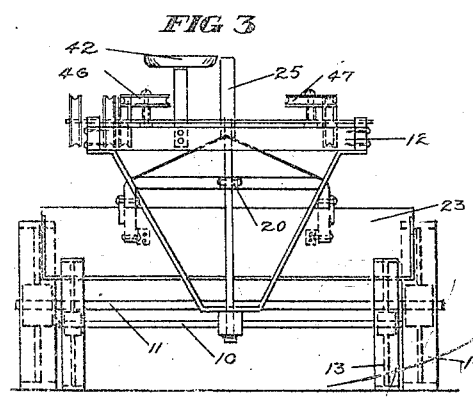
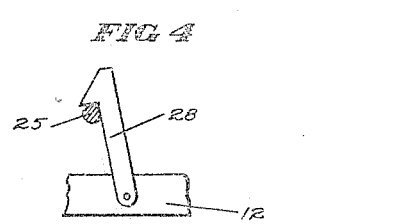
INVENTOR
SAMUEL WALKER
BY Hazard & Miller
Attys.

UNITED STATES PATENT OFFICE.

SAMUEL WALKER, OF JEROME, ARIZONA.

WHEELED SCRAPER.

1,269,347.

Specification of Letters Patent.   Patented June 11, 1918.

Application filed July 11, 1917.   Serial No. 179,938.

*To all whom it may concern:*

Be it known that I, SAMUEL WALKER, a citizen of the United States, residing at Jerome, in the county of Yavapai and State of Arizona, have invented new and useful Improvements in Wheeled Scrapers, of which the following is a specification.

This invention relates to a wheeled scraper.

The principal object of this invention is to provide a scraper for gathering and carrying soil, said scraper being provided with wheels which allow the shovel to be raised and carried over the ground without dragging.

Another object of this invention is to provide a scraper of the above class which is fitted with adjustments so that the scraping shovel may be canted to any desired angle, and may be raised, lowered and dumped, when desired, by an operator riding upon the implement.

Other objects will appear hereinafter.

The invention is illustrated, by way of example, in the accompanying drawings in which:

Figure 1 is a view in plan illustrating the completely assembled scraper, particularly showing the disposition of the scraper shovel in relation to the running gear and frame of the vehicle.

Fig. 2 is a view in side elevation illustrating the device shown in Fig. 1.

Fig. 3 is a view drawn at a reduced scale illustrating the front end of the scraper.

Fig. 4 is a fragmentary view in section and elevation illustrating the lifting lever catch.

Referring more particularly to the drawings, 10 indicates a front axle and 11 indicates a rear axle, both of which are mounted by suitable brackets beneath a structural frame 12. The front axle is fitted with a pair of wheels 13 and the rear axle with wheels 14. A king post 15 is provided the front axle so that it may swing horizontally and allow the vehicle to be steered. Mounted beneath the frame and pivotally secured to the king post is a vertically slidable subframe 16. This frame consists of oppositely diverging frame elements 17 and 18 which connect at their forward ends and are pivotally secured by a pin 19 to a knuckle 20, pivotally and slidably mounted upon the king post. The rear ends of the frame elements turn downwardly and are pivotally secured to shovel brackets 21 by pins 22. These brackets are fastened upon the rear wall of a scraping shovel 23. As particularly shown in Fig. 1, the scraping shovel is of considerable width and extends outwardly at opposite sides of the frame and the running gear, it having side boards and a forward scraping blade. This shovel is held in its normal upright position by trip dogs 24 which are pivoted to the downwardly extending portions of the frame and over-hang and engage the upper edge of the shovel rear wall. These dogs will act to hold the shovel in an upright position and when raised will release it to dump the material therefrom, thus allowing the shovel to assume the dotted line position indicated in Fig. 2.

The shovel may be raised and lowered at its front or rear ends, either simultaneously or separately. This is accomplished by the lifting lever 25 which is pivoted upon the frame and has a downward extension 26 adapted to connect with a lifting chain 27. This chain is secured at its opposite ends to the frame elements 17 and 18. The lever 25 is adapted to be swung vertically and when it has been actuated to raise the rear ends of the frame members 17 and 18, it may be secured by a catch 28, as particularly shown in Fig. 4. The forward end of the frame structure 16 is provided with a lifting cable 29 which is wrapped around a shaft 30. This shaft is mounted within bearings 31 and 32 upon the main frame 12. One end of the shaft 30 is fitted with a pulley wheel 33 around which a cable 34 is wrapped, one end of the cable being secured thereto. The opposite end of this cable is connected to an operating lever 35 which is preferably mounted along the right-hand side of the frame 12 and when shifted will cause the shaft 30 to rotate in a forward or reverse direction. A ratchet plate 36 is provided to be engaged by the lever so that it may be locked at any desired point in its travel. The opposite side of the ratchet plate 36 is fitted with teeth adapted to be engaged by a lever 37. This lever has a cable 38 fastened to it, said cable extending forwardly and around a pulley 39. The pulley 39 is fastened upon a shaft 40 which extends laterally of the main frame 12 and is rotatably mounted thereupon. A cable 41 is wrapped around the shaft 40 and is secured by its free end to the forward end of the shovel and at the center thereof. By manipulation of the lever 37, the shaft 40 may be rotated and the shovel drawn up from its dotted line position to the full line position as shown in Fig. 2.

In operation, the shovel normally drags upon the ground, due to the fact that the lifting lever 25 is raised and the lever 35 is swung forwardly to unwind the cable 29. It will be understood that the locking pawls 24 are normally in engagement with the back of the shovel as shown in Fig. 2, thus holding the floor of the shovel in a substantially horizontal position. After the shovel has been filled with dirt, the lifting lever may be swung down and locked, as shown in Fig. 2, and the lever 35 swung rearwardly to wind the cable 29. This will elevate the shovel. When it is desired to release the shovel to dump the dirt therefrom, the operator, seated upon the seat 42, depresses a foot pedal 43 to draw catch cables 44 and 45 rearwardly. These cables pass around idler pulleys 46 and 47 upon the frame, and thereafter over pulley wheels 48 and 49 rotatably mounted upon a shaft 50. The ends of the cables then are connected separately to the dogs 24. It has been found convenient to utilize the shaft 50 as a pivotal mounting for the lifting lever 25. When these pawls are lifted, the scraper shovel will fall. The shovel may be restored to its normal position by drawing the lever 37 rearwardly and thus rotating the shaft 40 to wind the cable 41 and lift the forward end of the shovel.

It will thus be seen that by the use of the device here disclosed, soil may be scraped and graded, as desired, and the bucket may be filled and carried to any point without dragging.

While I have shown the preferred construction of my wheeled scrapers as now known to me, it will be understood that various changes in the combination, construction and arrangement of parts may be made by those skilled in the art without departing from the spirit of my invention.

I claim:

1. In a wheeled scraper, a rectangular main frame, brackets extending downwardly from the frame at the front and rear ends, an axle mounted in the rear brackets, a king-post mounted in the front bracket, an axle connected to the king-post, wheels upon the axles, a knuckle pivotally and slidably mounted upon the king-post, a sub-frame pivotally connected to the knuckle and extending horizontally backwardly beneath the main frame; said sub-frame consisting of oppositely diverging bars turned downwardly at their rear ends; shovel brackets pivotally connected to the rear lower ends, a scraping shovel fastened to the shovel brackets, trip dogs pivoted to the turned down ends of the sub-frame and adapted to hold the shovel in its upright operative position, means for releasing the trip dogs to allow the shovel to dump, means for swinging the shovel to operative position after it has been dumped, and means for raising and lowering the sub-frame to raise and lower the shovel.

2. In a wheeled scraper, a main frame, a king-post vertically mounted and extending downwardly from the main frame, a knuckle slidingly and pivotally mounted upon the king-post, a sub-frame comprising diverging bars having down turned rear ends; the forward ends being pivotally connected to the knuckle; shovel brackets pivotally connected to the down turned rear ends, a shovel connected to the shovel brackets, trip dogs for holding the shovel upright, means for operating the trip dogs to dump the shovel, means for returning the shovel to its normal position, a lifting lever pivotally mounted upon the main frame, a chain connecting the lifting lever to the rear end of the sub-frame; so that by operating the lifting lever the rear end of the sub-frame may be raised or lowered; a shaft mounted at the forward end of the main frame, a cable wound upon the shaft and attached to the forward end of the sub-frame, a pulley upon the shaft, a cable operating upon the pulley, and an operating lever mounted upon the main frame and connected to the cable; so that by manipulating the operating lever the forward end of the sub-frame may be raised or lowered.

In testimony whereof I have signed my name to this specification.

SAMUEL WALKER.